Patented June 30, 1936

2,046,253

UNITED STATES PATENT OFFICE 2,046,253

PRODUCTION OF CELLULOSE-COATED PIGMENT

Frederick Baxter Downing, Carneys Point, N. J., and Richard Gesse Clarkson, Wilmington, Del., assignors to E. I. du Pont de Nemours & Company, Wilmington, Del., a corporation of Delaware No Drawing. Application July 19, 1933, Serial No. 681,218

8 Claims. (Cl. 134—58)

This invention relates to new compositions of matter, more particularly finely divided solids of novel properties, and a process for the production thereof.

When cellulose is esterified with anhydrides of dicarboxylic acids in the presence of tertiary amines, with or without a catalyst, cellulose mono-esters of dicarboxylic acids, that is, compounds in which one carboxyl group of the acid is free and the other carboxyl group is esterified with a hydroxyl group of the cellulose, are obtained. Usually, these compounds contain at least one molecule of the dicarboxylic acid for each molecule of the cellulose group. Such esters have the usual characteristics of an acid in that they are soluble in the common alkalis and are reprecipitated by the addition of acids.

In strongly alkaline solution, these cellulosic mono-esters of dicarboxylic acids are hydrolyzed, regenerating cellulose and the dicarboxylic acid. This hydrolysis is much accelerated by the application of heat. Thus, the addition of cellulose phthalic acid to aqueous alkali solutions produces salts which are colloidally soluble in water. The cellulose phthalic acid first swells and becomes jelly-like as it is converted into its salt and this then disperses in the water, forming a somewhat viscous solution. When such solutions are heated at a temperature above about 50° C., the cellulose phthalic acid is hydrolyzed, forming an alkali acid phthalate and regenerating cellulose. The hydrolysis reaction may be illustrated by the following equation:

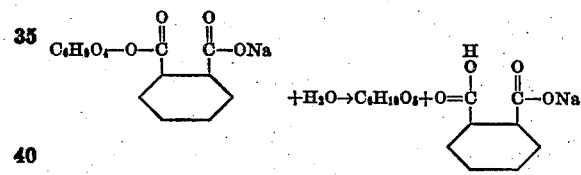

The cellulose thus regenerated is in fibrous form, much as it appears in nature.

It is an object of this invention to produce cellulosic materials in a new and improved physical form. A further object is the production of solid particles or granules of finely divided or even colloidal dimensions which are physically different from cellulose in being non-fibrous and having a different density but have the chemical properties of cellulose, for example, with respect to their affinity for dyes. Another object is the provision of new and improved colored substances in a fine state of sub-division, which substances may be used as pigments, fillers and the like. A still further object is the provision of a new and improved process for producing products of the character above described. Other objects will appear hereinafter.

These objects are accomplished according to this invention whereby cellulosic materials in a new and improved physical form are produced by suspending a finely divided solid substance or substratum in an aqueous solution of an alkali soluble salt of a cellulose mono-ester of a dicarboxylic acid and subjecting the said ester to hydrolysis, preferably by heating at a temperature above about 50° C. and preferably, also, with agitation. The resultant finely divided solid particles which form may be recovered in any suitable manner, e. g., by filtration. Contrary to expectation, a microscopic examination of these particles shows that they do not possess the fibrous physical form of cellulose but are substantially non-fibrous, massive particles of the same appearance as the original substratum. They differ from cellulose also as to density. Their chemical properties, on the other hand, are similar to those of cellulose. Hence, while it is very difficult to color ordinary inorganic solids, such as, for example, titanium dioxide or other substances which are useful in the preparation of pigments, these new products are easily colored by any of the usual dyeing methods applicable to cellulose.

The products are further characterized by different settling properties from those of the original substratum. In settling from aqueous suspensions they do not tend to settle into hard cakes which are difficult to redisperse but, on the contrary, settle in more or less uniform spherical particles which do not tend to form aggregations. The stability of the products has been tested by mechanical treatments, e. g., by rapid agitation in aqueous suspensions, without effecting separation of the component parts.

While the invention is susceptible to considerable variation and modification in the manner of its practical application, particularly as regards the nature and proportions of materials and the exact method of procedure in preparing the products, the following examples, in which the parts are by weight, will illustrate some of the products falling within the invention and how they may be prepared.

Example I

Five parts of cellulose phthalic acid were suspended in 150 parts of water and about ten parts of 30% sodium hydroxide added gradually in the course of thirty minutes. The mixture was agitated vigorously for a further thirty minutes, at the end of which time it was found that a clear, homogeneous, slightly viscous brown liquid had been formed. A separately prepared mixture of 100 parts of silica of 200 mesh fineness and 50 parts of water was now added to the solution and the whole heated to 80° C. with vigorous agitation for ten minutes.

The solid matter was then filtered off from the liquid with suction and dried at 60° C. in vacuo. It was found that the filtration was much more readily accomplished than the filtration of a like mass of untreated silica of the same fineness in that there was little or no tendency for the solid to clog the filter.

The filtrate contained no undecomposed cellulose phthalate since boiling the liquid for an hour gave no precipitate of cellulose. Phthalic acid could be obtained, however, by acidification and extraction.

Example II

A colloidal solution of five parts of cellulose phthalic acid in 150 parts of water and 10 parts of 40% potassium hydroxide was prepared as in Example I. A separately prepared mixture of 60 parts of titanium dioxide of 300 mesh fineness and 50 parts of water was added and the liquid heated at 60° C. for thirty minutes, mechanical agitation being used. The solid product was filtered off and dried as in Example I.

A microscopic examination of the products of Examples I and II showed only small massive particles of the same appearance as the original substrata. There was no aggregation of the particles, nor could any fibers be detected as would be expected if the products were mere mechanical mixtures of the substrata with regenerated cellulose.

Example III

Fifty parts of the product of Example II were suspended in 200 parts of water and 0.2 part of sodium hydrosulfite added. The suspension was mechanically agitated and heated to about 55° C. A vat was prepared separately consisting of 5 parts of sodium hydroxide, 8 parts of sodium hydrosulfite, 2.5 parts of Ponsol brilliant blue R paste (C. I. No. 1106), and 100 parts of water, heated to 50° C. and stirred until solution was complete. The vatted dye was then added to the suspension of the product of Example II and the entire mixture stirred at 50° C. to 60° C. for twenty minutes. The bright blue solid product was then filtered off and washed with a warm solution of sodium perborate to fix the dye. No dye could be obtained from the filtrate or the washings by blowing with air. The product was uniformly colored, no gradations in color, from top to bottom of the filter cake, being observable.

If titanium oxide alone or other similar solids are treated with the solution of the leuco vat color, then filtered, and subjected to oxidation, the dye remains in solution and the solid is left practically uncolored. Furthermore, precipitation of the dye by blowing with air or treatment with other oxidizing agents in the presence of titanium oxide alone or other similar solids gives a nonuniform mixture. Such a mixture when filtered gives a cake which is more intensely colored at the bottom than the top, or vice versa depending on the relative fineness of the solid substrata and the dye particles. Such mixtures may also be partially separated by settling their suspensions in water. No such mechanical treatments will serve to separate the component parts of products made by the process of Example III.

In the manner similar to that described in Example III, other vat dyes may be incorporated with the cellulosic particles. Examples of such dyes are 3:3'-dichloro-N-dihydro-1:2:2':1'-anthraquinone azine, other halogen-containing N-dihydro-1:2:2':1'-anthraquinone azines, flavanthrone, 4:5'-dibenzoylamino-1:1'-dianthraquinonyl carbazole, 4:4'-dibenzoylamino-1:1'-dianthraquinonyl carbazole, 5:5'-dibenzoylamino-1:1'-dianthraquinonyl carbazole, dimethoxy dibenzanthrone, 6:6'-diethoxy thioindigo, 4:4'-dimethyl-6:6'-diethoxy thioindigo, 5:5'-dichlor-7:7'-dimethyl thioindigo, bis-beta-naphthionaphene indigo, and tetra-bromo-indigo.

Example IV

To produce a product colored with a sulfur dye, the following procedure may be used:

With 100 parts of the finely divided product of Example II mix 350 parts of water, 0.5 part of sulfogene carbon H. Conc. (C. I. No. 978), 0.025 part of sodium carbonate, and 0.5 part of sodium sulfide. Boil for about two minutes, maintain at about 82° C. for ten minutes, add 5.0 parts of salt, maintain at about 82° C. for a further fifteen minutes, add another 5.0 parts of salt, maintain the same temperature for twenty-five minutes, then allow the color to oxidize with steam, and filter. A black pigment is obtained.

Similarly, the products of Examples I or II may be colored with other sulfur colors such as, for example, Sulfogene yellow G. G. (C. I. No. 955), Sulfogene green 2 B (C. I. No. 1006) and Sulfogene golden brown G. (C. I. No. 940).

Example V

To produce a product colored with an azo dye the following procedure may be used:

Add 100 parts of the finely divided product of Example II, 1.0 part of Pontamine sky blue 6 BX (C. I. No. 518) and 10 parts of salt to 400 parts of water maintained at a temperature of about 70° C. Heat to the boiling point in about ten to fifteen minutes, boil one-half hour, cool fifteen minutes and filter the product. A blue pigment is obtained.

Examples of other azo dyes which may be employed are Pontamine fast scarlet 4 BA (C. I. No. 326) which dyes directly from water usually with addition of sodium sulfate; Pontamine violet N (C. I. No. 394) which dyes directly from neutral or faintly alkaline baths with addition of sodium sulfate; and Pontamine yellow CH Conc. (C. I. No. 365).

The solid substances which are combined with cellulose according to the invention are of the type ordinarily used as fillers, such as, for example, barytes, alumina, whiting, clays, silica, talc, asbestos, magnesium carbonate, lithopone, zinc oxide and titanium dioxide. In general, the substance used should be characterized by water insolubility and should preferably be light in color. The state of subdivision of the particles may vary within relatively wide limits, but it is preferable that they be in a relatively fine state of subdivision. As a general rule, the degree of fineness may vary according to the purpose for which the product is to be used.

The alkali soluble salts of the cellulose monoesters of the dicarboxylic acids which are preferably employed in accordance with the invention are the salts of the cellulose mono-esters of dicarboxylic acids forming inner anhydrides. Examples of the cellulose mono-esters are those obtained by the reaction of cellulose with phthalic anhydride, succinic anhydride, quinolinic anhydride, adipic anhydride, maleic anhydride and the like, in the presence of tertiary amines. The production of various cellulose mono-esters is described in a co-pending application of Ferdinand Schulze, U. S. Serial No. 422,548. Among the alkali soluble salts of the cellulose mono-esters may be mentioned the sodium, potassium, lithium and ammonium salts.

No general limitation can be given with respect to the relative quantities of cellulose ester and substratum which should be employed, these proportions being determined by such factors as the fineness of the substratum and the results it is desired to attain. In general, the larger the proportion of the cellulose ester, the more the properties of the substratum are modified. In commercial practise, it is usually desirable to keep the proportion of cellulose ester relatively low on account of its comparatively higher cost.

The temperature employed in the hydrolysis may vary within relatively wide limits but, as previously indicated, should preferably be above about 50° C.

Any suitable method can be used in separating the precipitated particles. Since the particles do not tend to aggregate, filtration is a convenient method of separation.

The method employed in producing the dyed particles will vary with the type of dye. The use of reducible dyes such as vat colors is especially desirable since the cellulose coated particles may be suspended in the leuco and then removed prior to oxidation. In this manner, each particle absorbs a uniform amount of the leuco compound and any excess remains in the bath. As a result, upon oxidation the particles are uniformly coated with the dye and contain practically no free dye.

On account of their stability, uniformity and properties of non-aggregation, the products are useful for many purposes. They are especially desirable for use as fillers and pigments, for example, in paints and rubber.

While it has been previously proposed to produce materials suitable for roofing by coating crushed rock or similar materials with cellulose lacquers, which may be colored or uncolored, these substances are distinguished from the products of the present invention in a number of ways. In the first place, the cellulose lacquers or so-called cellulose solutions are not cellulose at all but cellulose derivatives and remain as such when applied to the solid particle. The coating thus applied is usually hard, more or less translucent, and subject to the disadvantages of lacquers, such as cracking. Once the lacquer has been applied, even though a clear lacquer is used, it is not practical, as a rule, to color the particles. To produce colored particles the color is incorporated with the lacquer before it is applied. The production of these lacquered granules further entails difficulties in drying the lacquer. Particularly is this true where the solids to be coated with the lacquer are of small dimensions, since there is a tendency for the lacquered particles to aggregate or cluster. In fact, insofar as is known, such lacquered granules have been described for use only as roofing materials and the like, and are not practical for the production of paints.

As distinguished from products of the character above described, the products of the present invention are particles or granules coated with regenerated cellulose and not a cellulose derivative. Furthermore, they may be produced in a fine state of subdivision such that they are suitable for use in paints and the like. The undyed particles are substantive to dyes which will dye cellulose and, therefore, may be colored by any of the usual dyeing methods. Whether they are colored or uncolored, the particles are characterized by uniformity. They are stable to boiling in aqueous solutions and do not tend to aggregate or form hard cakes on drying. In preparing these products it could not be foreseen that the cellulose precipitated from the solution by hydrolysis would coat the finely divided solids suspended therein. Rather was it to be expected that the cellulose would precipitate in fibrous form as in the case when no other solid substances are present.

The words "granules" and "particles" are used herein to refer to solids in a state of subdivision.

As many apparently widely different embodiments of the invention may be made without departing from the spirit and scope thereof, it is to be understood that we do not limit ourselves to the specific embodiments thereof except as defined in the following claims.

We claim:

1. The process which comprises subjecting an alkali salt of a cellulose mono-ester of a dicarboxylic acid to hydrolysis in the presence of an aqueous suspension of an inorganic pigment.

2. The process which comprises subjecting an alkali salt of a cellulose mono-ester of a dicarboxylic acid forming an inner anhydride to hydrolysis in the presence of an aqueous suspension of an inorganic pigment.

3. The process which comprises subjecting an alkali salt of cellulose phthalic acid to hydrolysis in the presence of an aqueous suspension of an inorganic pigment.

4. The process which comprises suspending about 5.0 parts of cellulose phthalic acid in about 150 parts of water, thereafter gradually adding about 10 parts of a 30% solution sodium hydroxide, stirring until a clear liquid is formed, then adding a mixture of 100 parts of silica of about 200 mesh fineness in about 50 parts of water, heating the whole mixture to a temperature of about 80° C. with agitation, and recovering the resultant finely divided solid.

5. The process of preparing pigments coated with a film of regenerated cellulose which comprises adding to an aqueous solution of an alkali salt of a cellulose mono-ester of a dicarboxylic acid a quantity of a stable solid material subdivided to pigment size, which is insoluble in said solution, and heating said material while suspended therein to a temperature sufficiently high to regenerate the cellulose.

6. The process of preparing pigments coated with a film of regenerated cellulose which comprises heating an aqueous alkaline solution of an alkali salt of a cellulose mono-ester of a dicarboxylic acid forming an inner anhydride to a temperature sufficiently high to regenerate the cellulose in the presence of a suspension of a stable solid material subdivided to pigment size.

7. The process of preparing pigments coated with a film of regenerated cellulose which comprises heating an aqueous alkaline solution of an alkali metal salt of cellulose phthalic acid to a temperature sufficiently high to regenerate the cellulose in the presence of a suspension of a stable solid material subdivided to pigment size.

8. The process which comprises suspending cellulose phthalic acid in water, adding at least a sufficient amount of sodium hydroxide to form a solution of the mono-sodium salt of cellulose phthalic acid, suspending finely divided titanium dioxide in said solution, and heating the solution with titanium dioxide suspended therein to a temperature sufficiently high to regenerate the cellulose.

FREDERICK BAXTER DOWNING.
RICHARD GESSE CLARKSON.